Patented Feb. 23, 1937

2,071,468

UNITED STATES PATENT OFFICE 2,071,468

MANUFACTURE OF PERYLENE

Friedrich Kuhrmann, Dessau in Anhalt, and Paul Nawiasky and Otto Grosskinsky, Ludwigshafen-on-the-Rhine, Germany, assignors to General Aniline Works, Inc., New York, N. Y., a corporation of Delaware No Drawing. Application October 17, 1934, Serial No. 748,760. In Germany November 2, 1933

6 Claims. (Cl. 260—168)

Our present invention relates to an improvement in the manufacture of perylene and more particularly to such a process in which dinaphthyls are converted into perylene by heating with a condensing agent, preferably with aluminium chloride.

We have found that perylene is formed with very satisfactory yields when carrying out the said condensation in the presence of products enhancing the reaction velocity and especially in the presence of agents acting as oxidants. As substances suited for the purpose set forth, we enumerate, for instance, air, oxygen, pyrolusite, permanganates, chromic acid, alkali metal bichromates, arsenic acid, vanadic acid, molybdic acid, titanium tetrachloride, and ferric chloride.

A further improvement consists in the addition of an alkali metal chloride or a mixture of such chlorides to the aluminium chloride melt. Thus, we may carry out the condensation of dinaphthyls in a melt consisting of sodium chloride and aluminium chloride or of sodium chloride, potassium chloride and aluminium chloride. When using these chloride mixtures, the working up of the aluminium chloride melt is essentially facilitated.

As starting materials we may use either the individual isomeric dinaphthyls of the formulae

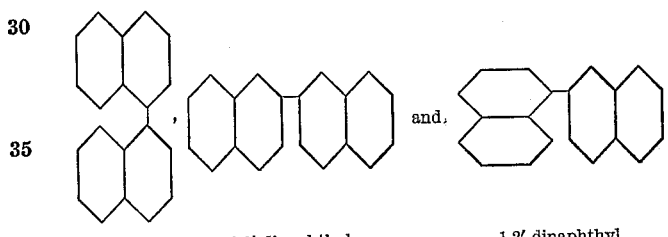

1.1'-dinaphthyl   2.2'-dinaphthyl   1.2'-dinaphthyl or preferably a mixture of these isomeric dinaphthyls as obtainable, for instance, by passing naphthalene vapors at a temperature higher than 700° C., preferably in a diluted state, over catalysts consisting of difficultly reducible metal oxides which are covered by a coating of carbon with metallic luster.

The following examples serve to illustrate our invention without limiting it, the parts being by weight:—

Example 1.—In an enamelled vessel 1600 parts of finely ground aluminium chloride, 200 parts of potassium chloride, and 200 parts of sodium chloride are molten and while stirring, 200 parts of 2.2'-dinaphthyl and 10 parts of finely pulverized pyrolusite are introduced into the melt in ½ hour at 100° C. The introducing finished, stirring is continued for further 2 hours at about 110° C.; then the melt is poured on ice, the mixture is boiled under addition of an acid and the separated product is filtered off. By sublimation at 310° C. under highly reduced pressure a dry yellow product is obtained which is purified first by washing with a mixture of carbon tetrachloride and methanol (1:1) and finally with pure carbon tetrachloride. The residue is practically pure perylene melting at 260 to 265° C.

In an analogous manner 1.1'- or 1.2'-dinaphthyl are converted into perylene.

Example 2.—In an enamelled vessel a melt of 1600 parts of finely ground aluminium chloride, 200 parts of potassium chloride, and 200 parts of sodium chloride is prepared. During ½ hour, 200 parts of a mixture consisting of the three isomeric dinaphthyls and 5 parts of finely pulverized pyrolusite are introduced into the melt at about 100 to about 110° C.; while stirring, the temperature is kept for 2 hours at 110° C. Then the melt is poured on ice, an inorganic acid is added and the mixture is boiled. The separated product is filtered by suction, washed with water and dried. The crude perylene, thus obtained, is sublimed under highly reduced pressure and the sublimed compound is washed with a mixture of methanol and carbon tetrachloride (1:1) and finally with pure carbon tetrachloride. Perylene of melting point 260° C. is obtained in a yield corresponding to 50 per cent. of the theoretical.

It is obvious that our invention is not limited to the foregoing examples or to the specific details given therein.

In these examples we have disclosed pyrolusite as an agent enhancing the reaction velocity. However, the other compounds enumerated above, may be used for the same purpose.

What we claim is:—

1. The process for manufacturing perylene which consists in heating a dinaphthyl with anhydrous aluminium chloride in the presence of an alkali metal chloride whilst admixing an oxidizing agent.

2. The process for manufacturing perylene which consists in heating a dinaphthyl with anhydrous aluminium chloride in the presence of an alkali metal chloride and of pyrolusite.

3. The process for manufacturing perylene which consists in heating 1.1'-dinaphthyl with anhydrous aluminium chloride in the presence of an alkali metal chloride and of pyrolusite.

4. The process for manufacturing perylene which consists in heating 2.2'-dinaphthyl with anhydrous aluminium chloride in the presence of an alkali metal chloride and of pyrolusite.

5. The process for manufacturing perylene which consists in heating 1.2'-dinaphthyl with anhydrous aluminium chloride in the presence of an alkali metal chloride and of pyrolusite.

6. The process for manufacturing perylene which consists in heating a dinaphthyl with anhydrous aluminium chloride in the presence of an alkali metal chloride and a solid oxidizing agent.

FRIEDRICH KUHRMANN.
PAUL NAWIASKY.
OTTO GROSSKINSKY.